US006362538B1

(12) United States Patent
Reed et al.

(10) Patent No.: US 6,362,538 B1
(45) Date of Patent: Mar. 26, 2002

(54) ELECTRICAL CONTROL POPOUT ACTUATOR MECHANISM

(75) Inventors: Thurman Russell Reed, Indianapolis, IN (US); Jacob John Ruden, Roscoe, IL (US); Timothy Dean Garner, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/337,479

(22) Filed: Jun. 21, 1999

(51) Int. Cl.[7] .................... B60L 1/00
(52) U.S. Cl. .................... 307/10.1; 200/523
(58) Field of Search .................... 307/10.1; 200/523, 200/524; 74/553, 504

(56) References Cited

U.S. PATENT DOCUMENTS

| | | | | | |
|---|---|---|---|---|---|
| 3,100,404 | A | * | 8/1963 | Boeddeker | 74/553 |
| 3,512,427 | A | * | 5/1970 | Metcalf | 74/471 |
| 3,557,637 | A | * | 1/1971 | Tomczak | 74/553 |
| 4,365,231 | A | * | 12/1982 | Nishioka | 338/334 |
| 5,384,442 | A | * | 1/1995 | Danner | 200/566 |
| 5,967,301 | A | * | 10/1999 | Reed et al. | 200/523 |

* cited by examiner

*Primary Examiner*—Josie Ballato
*Assistant Examiner*—Sharon Polk
(74) *Attorney, Agent, or Firm*—Jimmy L. Funke

(57) ABSTRACT

An electrical control popout actuator mechanism preferably integrated with a trimmer potentiometer is vertically mounted directly to a printed circuit board. The electrical control popout actuator mechanism has a cam cylinder member, a spring biasing member, a shaft member, and a follower member which allow it to extend during use and retract when not in use. Flanges on said follower member follow cooperating cam paths to allow activation of the mechanism.

18 Claims, 2 Drawing Sheets

ELECTRICAL CONTROL POPOUT ACTUATOR MECHANISM

TECHNICAL FIELD

The present invention relates generally to electrical switches and more particularly, to electrical control popout actuator mechanisms.

BACKGROUND ART

Currently, many products use controls that extend for easy use and retract for protection and appearance. This trend can be seen in several electronic applications that allow the user to adjust various settings. For example, a typical radio has adjustable volume, tuning, bass, treble and fade. Through the use of popout actuator mechanisms, these electronic applications can be made more aesthetically pleasing to the end customer.

Present electrical popout mechanisms are typically horizontally mounted. This means that the control is mounted to a separate piece of breakaway printed circuit board (PCB) which runs parallel to the centerline of the control. The electrical connection for the system integration of these controls is accomplished with connectors and a wiring harness or flat ribbon cable.

The principle disadvantage of present horizontally mounted popout controls is its large number of parts. The material cost of a horizontally mounted popout control is relatively high due to the PCB, mounting hardware, connectors, and wiring harness. These several parts also take up valuable space that could be used for other features or to reduce total package size. Manufacturability and reliability are also affected by the complexity of present electrical popout control mechanism and systems. The extra connections between the two PCBs create opportunities for electrical problems that could result in product failure, and a decrease in accuracy and reliability.

The complexity of horizontally mounted popout control mechanisms also increases assembly and manufacturing costs. Considerable design and assembly efforts are required to incorporate existing popout controls into a product due to the difficulties of component alignment.

In an effort to overcome the disadvantages of horizontally mounted popout control mechanisms, some attention has been directed to vertical mount mechanisms. This technology, however, has shortcomings as well. The cam profiles of the current vertical mount technology face each other and are in contact when the shaft member is rotated. This results in unnecessary cam profile wear and in decreased product life. Also, the spring member is mounted on the outside of the shaft member, which makes it subject to contamination. Finally, the shaft members of vertically mounted popout controls often have excessive wobble making them difficult to align.

SUMMARY OF THE INVENTION

It is, therefore, an object of the invention to provide an improved electrical popout control mechanism and system. Another object is to provide an electrical popout control mechanism and system having reduced cost and complexity as compared to present popout controls. A further object of the invention is to improve the package space needed for popout control mechanisms.

In one aspect of the invention, an electrical control popout actuator mechanism is integrated with a trimmer potentiometer and vertically mounted directly to a printed circuit board. The electrical control popout actuator mechanism is made up of four major parts: a cam cylinder member, a spring member, a shaft member, and a follower member. Together, these parts allow the electrical control popout actuator mechanism to extend during use and retract when not in use.

The cam cylinder member is integrated with, and used to turn, the trimmer potentiometer. The cam cylinder member is a hollow tube in which the shaft member and follower member resides. The cam cylinder member has one or more shaft member flange slots for keying the shaft member, and an outer cam path for rotating the follower member. The spring member encircles and is attached to the outside of the cam cylinder member. The spring member is used to apply force to one or more flanges on the shaft member and to the end of the cam cylinder member.

The shaft member has a cylindrical shape and is located in the cam cylinder member. One or more shaft member flanges are utilized to key the shaft member to the cam cylinder member. The shaft member flanges extend through the cam cylinder member and engage the spring member. The shaft member also contains an inner cam path for rotating the follower member in conjunction with the outer cam path.

The follower member is mounted to the shaft member such that it can rotate freely about the axis of the shaft member. The follower member also has one or more follower member flanges that are engaged by the inner and outer cam paths such that the follower member is rotated by the cam paths when the shaft member is moved.

The present invention thus achieves an electrical control popout actuator mechanism with fewer parts then conventional technology. The present invention is advantageous in that it reduces the overall cost while improving reliability and packaging space. Further advantages are reduced assembly complexity and improved actuator alignment.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
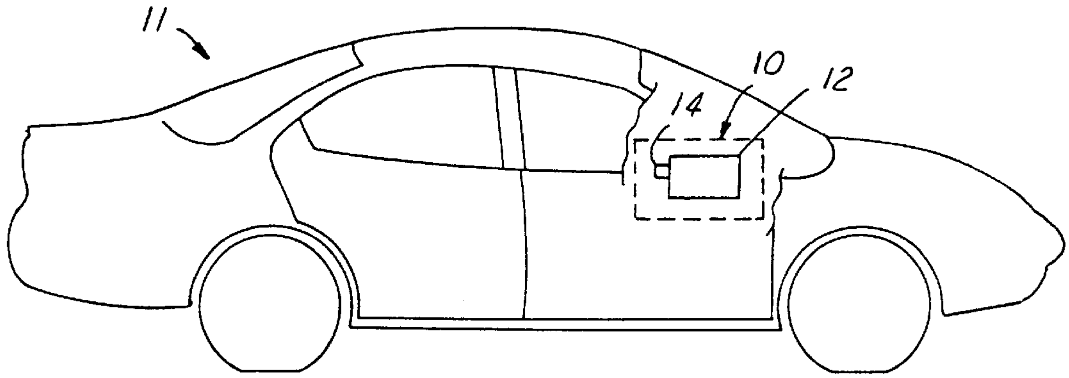
FIG. 1 depicts a control system in a vehicle.

Referring to FIG. 1, a control system 10 such as a radio 12 in a vehicle 11 is depicted. One or more of the radio functions can be adjusted using an electrical control popout actuator mechanism 14. Such mechanisms can be extended, for example, to change the radio settings, and retracted when not in use for, among other things, aesthetics. While the electronic device 12 has been described as a radio, it is to be understood that this is merely illustrative of the type of electronic devices with which the electrical control popout mechanism 14 is intended. For example, the actuator 14 could control the temperature of the vehicle heater/vent/air conditioning system or be used in non-automotive applications.

Figure 2:
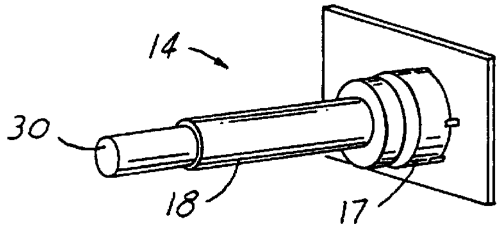
FIG. 2 is a perspective view of an electrical control popout actuator mechanism in accordance with one embodiment of the present invention.

Referring now to FIG. 2, a perspective view of an electrical control popout actuator mechanism 14 in accordance with the present invention is illustrated. Electrical control popout actuator mechanism 14 is integrated with a trimmer potentiometer 17 and is vertically or perpendicularly mounted to a printed circuit board (PCB) 16. In the present embodiment, the printed circuit board (PCB) 16 is part of the keyboard (not shown) of electronic device 12.

Several advantages are realized because of the vertically mounted electrical control popout actuator mechanism 14. In a radio application, all of the components are contained between the PCB 16 keyboard and the trim plate (not shown), resulting in efficient space utilization. Also, in contrast to horizontally mounted controls, there is no need for an additional breakaway PCB, connector, and ribbon cable. Electrical control popout actuator mechanism 14 can be soldered with the PCB 16 during a wave solder process, or it can be heat staked to the PCB 16 without a secondary operation.

Figure 3:
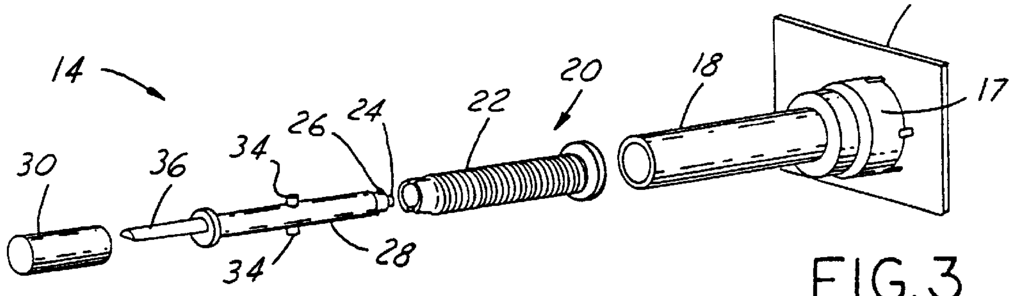
FIG. 3 is an exploded view of the electrical control popout actuator mechanism of FIG. 2.
Figure 4:
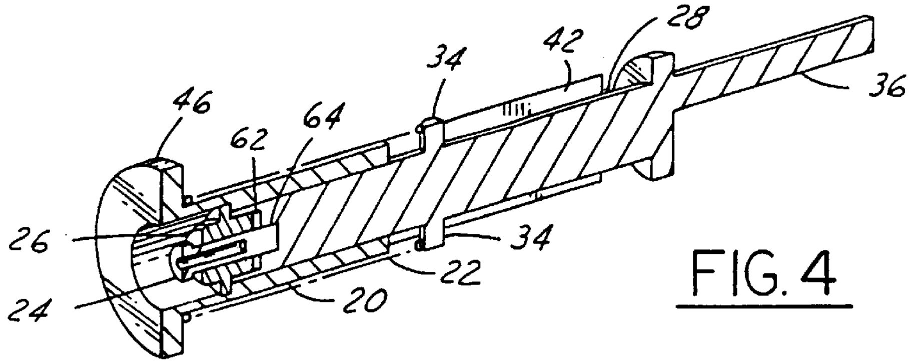
FIG. 4 is a cross sectional view of a portion of the electrical control popout actuator mechanism shown in FIG. 2.

Referring to FIGS. 3 and 4, an exploded and a cross sectional view of an electrical control popout actuator mechanism 14 in accordance with one embodiment of the present invention is illustrated. The electrical control popout actuator mechanism 14 comprises housing 18, a cam cylinder member 20, a spring member 22, a pin 24, a follower member 26, a shaft member 28, and a knob 30. These components will now be described in greater detail.

Housing 18 is fixedly attached to the trimmer potentiometer 17. The housing 18 surrounds the cam cylinder member 20 to provide protection from the environment for the spring member 22 and other components. Housing 18 also makes the electrical control popout actuator mechanism 14 a self-contained and enclosed entity.

Figure 8:
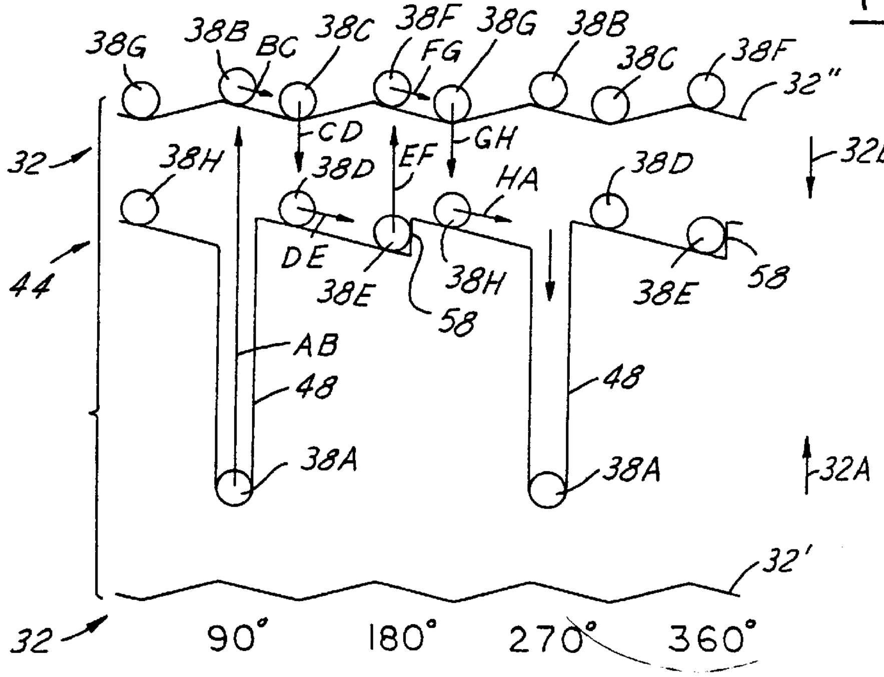
FIG. 8 is a diagram of the inner cam path interposed on the outer cam path used in the electrical control popout actuator mechanism of FIG. 2.
Figure 5:
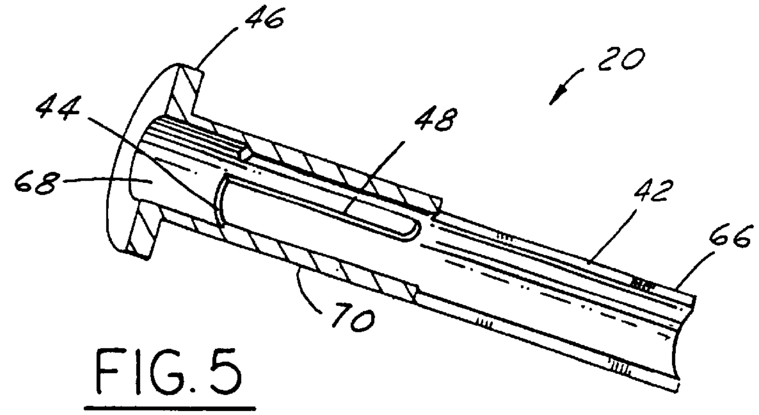
FIG. 5 is a sectional view of the cam cylinder member used in the electrical control popout actuator mechanism of FIG. 2.

Referring to FIG. 5, a cut away view of the cam cylinder member 20 used in the electrical control popout actuator mechanism 14 of FIGS. 2 and 3 is illustrated. Cam cylinder member 20 has a tubular body 70 with an interior 68 and exterior 66 wall surface. When the mechanism is assembled, the cam cylinder 20 is positioned inside of housing 18 such that it can freely rotate. One end of cam cylinder member 20 has a flange or spring member seat 46 that is attached to and engages the trimmer potentiometer 17. The opposite end of cam cylinder member 20 has two slots 42 for receiving a keyed shaft member 28. In the preferred embodiment shown, the length each slot 42 is approximately nine millimeters. The interior surface 68 of cam cylinder member 20 contains an outer cam path 44 which has two sets of two 20° slants separated by two slots 48. The depth of these slots 48 controls the length of the stroke of the device. In the preferred embodiment shown, each slot 48 is approximately eight millimeters in length. The outer cam path 44 is best illustrated by FIG. 8, which is further discussed below.

Referring again to FIG. 3, the spring member 22 is attached to the outside of the cam cylinder member 20. The spring member force is applied between the spring member seat 46 and two shaft member flanges 34. In one embodiment, the spring member 22 can have an inner radius of 2.3 millimeters, a compressed length of less than 11.25 millimeters, and a free length of more than 22 millimeters.

Figure 6:
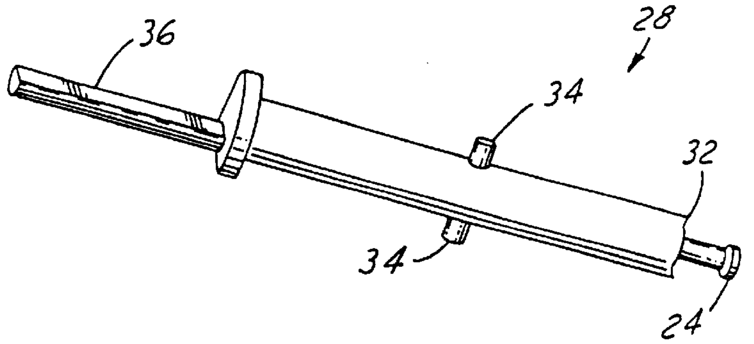
FIG. 6 is an isometric view of the shaft member used in the electrical control popout actuator mechanism of FIG. 2.

Referring now to FIGS. 4 and 6, the shaft member 28 used in the electrical control popout actuator mechanism 14 of FIG. 2 is illustrated. Shaft member 28 is a cylindrical rod, having two shaft member flanges 34, which are positioned inside of, and keyed to, cam cylinder member 20. Thus, the shaft member 28 can freely move along the bore of cam cylinder member 20, but rotation of shaft member 28 causes rotation of cam cylinder member 20. One end of the shaft member 28 has a standard D-shaped end 36 that is attached to a knob 30 (FIG. 2) in a conventional manner. For this purpose, knob 30 has a mating D-shaped slot or receptacle for mating with end 36. The opposite end of the shaft member 28 includes a shaft member bore 62 and a pin bore 64 for a press-fit pin 24. This end is also shaped to form an inner cam path 32. The inner cam path 32 includes eight 15° slants. The inner cam path 32 is best illustrated by FIG. 8, which is further discussed below.

Figure 7:
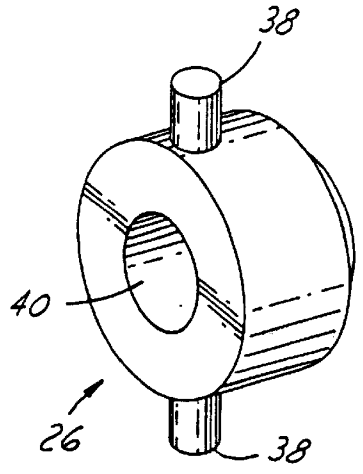
FIG. 7 is an isometric view of the follower member used in the electrical control popout actuator mechanism of FIG. 2.

Referring to FIG. 7, an isometric view of the follower member 26 used in the electrical control popout actuator mechanism 14 of FIG. 2 is illustrated. Follower member 26 is cylindrical and has a bore 40 and two pins or flanges 38. As shown in FIGS. 4 and 6, the follower member 26 is attached to the shaft member 28 by a press-fit pin 24. The diameter of the pin 24 is less than that of the follower member bore 40 such that the follower member 26 can rotate freely about the pin 24, which is coaxial with the shaft member 28, and move axially to clear inner cam path 32. The outer diameter of follower member 26 fits within the shaft member bore 62 to allow the follower member flanges 38 to engage the inner cam path 32 at the end of the shaft member 28 and the outer cam path 44 (FIG. 6).

In operation, the electrical control popout actuator mechanism 14 can be extended for use or retracted when not in use by pushing and releasing knob 30. This is achieved by the interaction of the follower member flanges 38 on the follower member 26 with the inner cam path 32 (located on the end of the shaft member 28) and the outer cam path 44 (located on the interior wall 68 of the cam cylinder member 20). Because the follower member 26 is rotatably mounted to the shaft member 28, the position of the shaft member 28, i.e. extended or retracted, is controlled by the position of the follower member 26.

Each time the knob 30 is pressed the inner cam path 32 on the end of the shaft member 28 engages the follower member flanges 38 on the follower member 26 to rotate the follower member 26. When the knob 30 is released the outer cam path 44, located on the interior wall 68 of the cam cylinder member 20 engages the follower member flanges 38 on the follower member 26 to 'catch' the follower member 26. Because the outer cam path 44 has two 'catches' the shaft member 28 has two positions; extended and retracted. In this way the shaft member 28 can be extended or retracted by pushing and releasing the knob 30.

Referring now to FIG. 8, a diagram of the inner cam path 32 interposed on the outer cam path 44 is illustrated. In operation, the inner cam path 32 moves in relation to outer cam path 44 to rotate and seat the follower member 26 in its desired position. When the shaft member 28 is extended the inner cam path 32 is in position 32'. When the shaft member 28 is pushed the inner cam path 32 is in position 32".

The operation of the popout actuator mechanism 14 will be described with regard to FIGS. 4 and 8. Because the follower member 26 is attached to the shaft member 28 with a press-fit pin 24, the orientation of follower member 26 controls the position of the shaft member 28, i.e., either extended or retracted. Assuming that shaft member 28 is extended, the orientation of the follower member 26 places the follower member flanges 38 at the bottom of the outer cam slot 48 in position 38A.

When the shaft member 28 is pushed in direction 32A by knob 30, the inner cam path 32 engages the follower member flanges 38, which are in position 38A, and pushes the follower member flanges 38 along path AB. Because the outer cam slot 48 traps the follower member flanges 38 the follower member 26 can not rotate. However, when the follower member flanges 38 clear the outer cam slot 48 the follower member flanges 38 rotate from position 38B to position 38C following path BC on the inner cam path 32. At this point the inner cam path 32 is in position 32".

When shaft member 28 is released, the spring member 22 pushes the inner cam path 32 in direction 32B and the follower member flanges 38 follow path CD until they reach position 38D. Once the follower member flanges 38 are in position 38D, they rotate along path DE following the outer cam path 44 until reaching position 38E. At this point, the shaft member 28 is in the retracted position.

Assuming the shaft member 28 is in the retracted position, when the shaft member 28 is pushed in direction 32A by knob 30, the inner cam path 32 engages the follower member flanges 38, which are in position 38E, and pushes the follower member flanges 38 along path EF. Because the outer cam retracted catch 58 traps the follower member flanges 38 the follower member 26 can not rotate. However, when the follower member flanges 38 clear the outer cam retracted catch 58, the follower member flanges 38 rotate from position 38F to position 38G following path FG on the inner cam path 32. At this point the inner cam path is in position 32"

When the shaft member 28 is released, the spring member 22 pushes the inner cam path 32 in direction 32B and the follower member flanges 38 follow path GH until they reach position 38H. Once the follower member flanges 38 are in position 38H, they rotate along path HA following the outer cam path 32 until reaching position 38A. At this point, the shaft member 28 is in the extended position.

From the foregoing, it can be seen that there has been brought to the art a new and improved electrical control popout actuator mechanism. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

We claim:

1. An electrical control popout actuator mechanism for integration with a printed circuit board, comprising:

a cam cylinder member, having a tubular body defining interior and exterior wall surfaces, one end of said cam cylinder member having a spring member seat and being perpendicularly mounted to said PCB, the other end of said cam cylinder member having at least one shaft member flange slot parallel to the axis of said tubular body, said interior wall surface having outer cam path slants and slots defining an outer cam path parallel with the axis of said tubular body;

a shaft member having a cylindrical body having an exterior wall surface, and at least one shaft member flange, said shaft member positioned in said cam cylinder member and said shaft member flanges positioned in said corresponding shaft member flange slots, said shaft member flange extending away from said cylindrical body and through said tubular body of said cam cylinder member thereby integrating said cam cylinder member and said shaft member, said exterior wall surface of said shaft member forming an inner cam path with inner cam path slants at one end of said shaft member, said outer cam path and said inner cam path having a cam profile in the same direction parallel to the axis of said cam cylinder member;

a follower member having a tubular body including at least one follower member flange, said follower member rotatably coupled to said shaft member and positioned in said cam cylinder member such that said follower member flange engages said outer cam path and said inner cam path; and a spring member mounted within said cam cylinder member and positioned between said spring member seat and said at least one shaft member flange for biasing said follower member flanges against said inner and outer cam paths.

2. An electrical control popout actuator mechanism as recited in claim 1 further comprising a tubular housing, said cam cylinder member positioned in said tubular housing.

3. An electrical control popout actuator mechanism as recited in claim 1 further comprising a knob fixed to one end of said shaft member for rotating said mechanism.

4. An electrical control popout actuator mechanism as recited in claim 1 wherein said cam cylinder member has two shaft member flange slots.

5. An electrical control popout actuator mechanism as recited in claim 1 wherein said outer cam path includes two sets of two outer cam path slants separated by two outer cam path slots, said outer cam path slants being approximately twenty degrees to the horizontal.

6. An electrical control popout actuator mechanism as recited in claim 1 wherein said shaft member has two shaft member flanges.

7. An electrical control popout actuator mechanism as recited in claim 1 wherein said inner cam path includes eight inner cam path slants that are approximately fifteen degrees from the horizontal.

8. An electrical control popout actuator mechanism as recited in claim 1 wherein said follower member is attached to said shaft member using a press-fit pin.

9. An electrical control popout actuator mechanism as recited in claim 1 wherein said follower member has two follower member flanges.

10. A control system within a vehicle, said control system having a user adjustable function, said function controlled by an electrical control popout actuator mechanism integrated with a trimmer potentiometer, comprising:

an electronic device located in said vehicle for providing a function;

an electrical control popout actuator mechanism integrated with a PCB in said electronic device for adjusting said function, comprising:

a cam cylinder member, having a tubular body defining interior and exterior wall surfaces, one end of said cam cylinder member having a spring member seat and being perpendicularly mounted to said PCB, the other end of said cam cylinder member having at least one shaft member flange slot parallel to the axis of said tubular body, said interior wall surface having outer cam path slants and slots thereby defining an outer cam path parallel to said cam cylinder member;

a shaft member having a cylindrical body having an exterior wall surface and at least one shaft member flange, said shaft member positioned in said cam cylinder member and said shaft member flanges positioned in said corresponding shaft member flange slot, said shaft member flange extending away from said cylindrical body and through said tubular body of said cam cylinder member thereby integrating said cam cylinder member and said shaft member, said exterior wall surface of said shaft member forming an inner cam path with inner cam path slants at one end of said shaft member, said outer cam path and said inner cam path having a cam profile in the same direction parallel to the axis of said tubular body;

a follower member having a tubular body including at least one follower member flange, said follower member rotatably coupled to said shaft member and positioned in said cam cylinder member such that said follower member flange engages said outer cam path and said inner cam path; and a coil spring member within said cam cylinder member and positioned between said spring member seat and said shaft member flange for biasing said follower member flanges against said inner and outer cam paths.

11. An electrical control popout actuator mechanism as recited in claim 10 further comprising a tubular housing, said cam cylinder member positioned in said tubular housing.

12. An electrical control popout actuator mechanism as recited in claim 10 further comprising a knob fixed to one end of said shaft member for rotating said mechanism.

13. An electrical control popout actuator mechanism as recited in claim 10 wherein said cam cylinder member has two shaft member flange slots.

14. An electrical control popout actuator mechanism as recited in claim 10 wherein said outer cam path includes two sets of two outer cam path slants separated by two outer cam path slots, said outer cam path slants being approximately twenty degrees to the horizontal.

15. An electrical control popout actuator mechanism as recited in claim 10 wherein said shaft member has two shaft member flanges.

16. An electrical control popout actuator mechanism as recited in claim 10 wherein said inner cam path includes eight inner cam path slants that are approximately fifteen degrees from the horizontal.

17. An electrical control popout actuator mechanism as recited in claim 10 wherein said follower member is attached to said shaft member using a press-fit pin.

18. An electrical control popout actuator mechanism as recited in claim 10 wherein said follower member has two follower member flanges.

* * * * *